United States Patent [19]

Coulter et al.

[11] E Re. 31,572

[45] Reissued May 1, 1984

[54] PULVERIZED FUEL DELIVERY SYSTEM FOR A BLAST FURNACE

[75] Inventors: Earl E. Coulter, Akron; Fritz L. Hemker, Wadsworth; Elias A. Kazmierski, Akron, all of Ohio

[73] Assignee: The Babcock & Wilcox Company, New Orleans, La.

[21] Appl. No.: 408,142

[22] Filed: Aug. 16, 1982

Related U.S. Patent Documents

Reissue of:

[64] Patent No.: 3,720,351
Issued: Mar. 13, 1973
Appl. No.: 140,905
Filed: May 6, 1971

U.S. Applications:

[60] Division of Ser. No. 799,773, Feb. 17, 1969, abandoned, and a continuation of Ser. No. 248,377, Mar. 27, 1981, abandoned.

[51] Int. Cl.[3] ..... B67B 7/00
[52] U.S. Cl. ..... 222/1; 75/42
[58] Field of Search ..... 220/85 P; 215/246; 137/316; 222/153, 182, 402.11, 402.13, 384, 402, 1; 75/42

[56] References Cited

U.S. PATENT DOCUMENTS

| | | | |
|---|---|---|---|
| 2,477,804 | 8/1949 | Huber | 236/15 BD |
| 3,167,421 | 1/1965 | Pfeiffer et al. | 75/42 |
| 3,230,016 | 1/1966 | Gilbert et al. | 406/124 |
| 3,252,618 | 5/1966 | Anderson et al. | 222/1 |
| 3,347,418 | 10/1967 | Fefferman | 222/61 |
| 3,599,832 | 8/1971 | Smith | 222/57 |
| 3,795,418 | 3/1974 | Barényi | 293/136 |
| 3,840,260 | 10/1974 | Wacker et al. | 293/132 |
| 3,847,428 | 11/1974 | Uebelstädt | 293/132 |
| 4,061,386 | 12/1977 | Chupick | 293/134 |

FOREIGN PATENT DOCUMENTS

| | | | |
|---|---|---|---|
| 2316220 | 10/1974 | Fed. Rep. of Germany | 293/120 |

OTHER PUBLICATIONS

"Coal Injection into No. 5 Blast Furnace at Stanton and Stavely Ltd.". Journal of Iron and Steel Institute, vol. 201; Aug. 1963; Summers et al.

"Engineering and Design Considerations of Coal Injection", AIME Procedings of the 23rd Conference, vol. 23, 1964: Summers.

*Primary Examiner*—David A. Scherbel
*Attorney, Agent, or Firm*—Robert C. Mai; Robert J. Edwards

[57] ABSTRACT

A pulverized fuel delivery system for a blast furnace in which pulverized coal is delivered in dense phase fluidized form into the blast furnace from gas pressurized tanks that are placed in communication, one at a time, in cyclical sequence with a penumatic transport means. The tank gas pressure is regulated in accordance with the blast furnace wind rate to control the weight flow rate of pulverized coal into the furnace and the transport gas flow rate is regulated in accordance with the fuel weight flow rate to maintain a prescribed transport gas flow rate per pound of coal delivered to the furnace.

9 Claims, 2 Drawing Figures

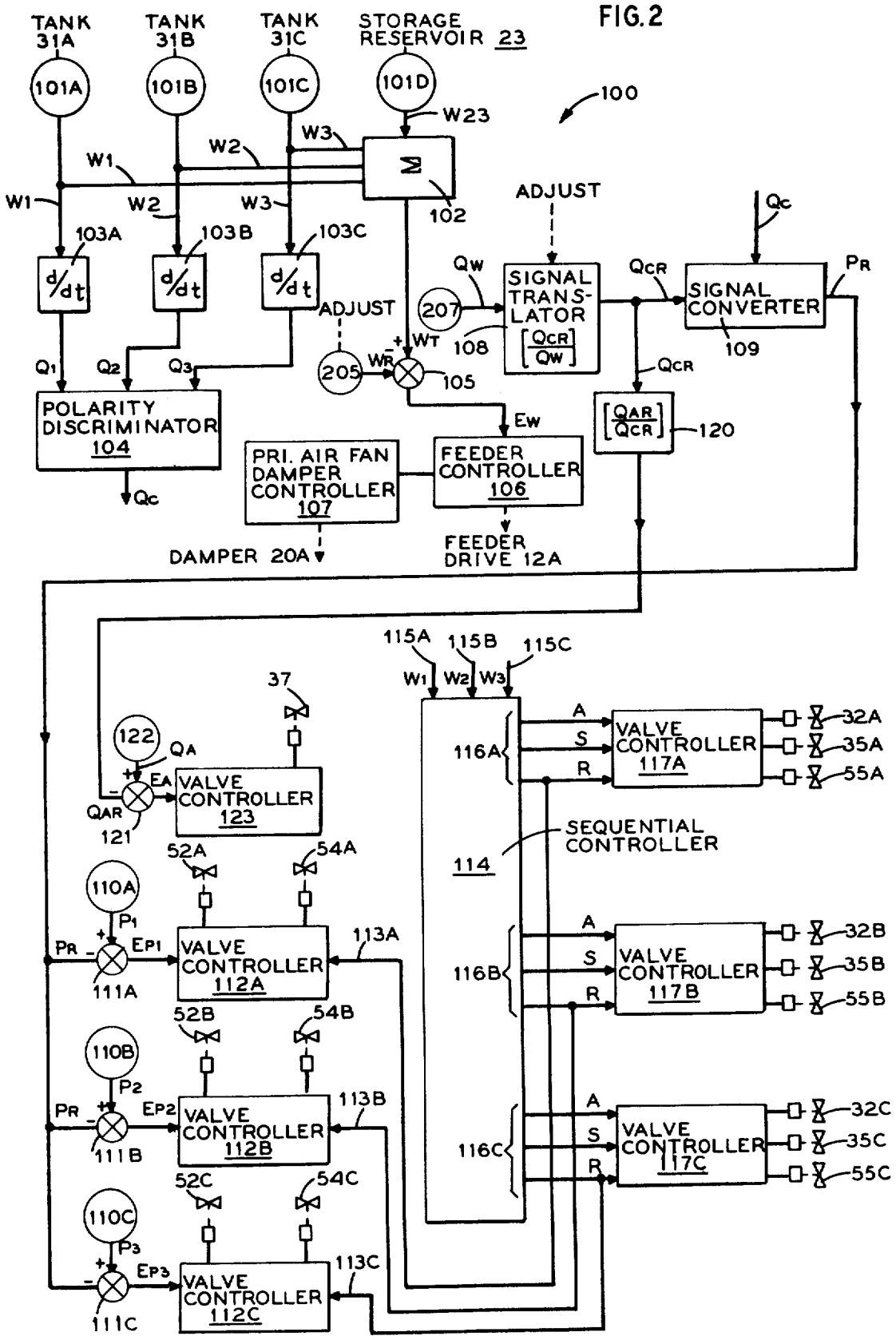
FIG. 2
TANK 31A
TANK 31B
TANK 31C
STORAGE RESERVOIR 23
101A
101B
101C
101D
W23
100
W1
W2
W3
Σ
102
ADJUST
Qc
103A
103B
103C
d/dt
Qw
SIGNAL TRANS-LATOR
QCR
SIGNAL CONVERTER
PR
207
ADJUST
WT
108
109
Q1
Q2
Q3
205
WR
105
QCR
POLARITY DISCRIMINATOR 104
Ew
[QAR/QCR]
120
PRI. AIR FAN DAMPER CONTROLLER 107
FEEDER CONTROLLER 106
Qc
DAMPER 20A
FEEDER DRIVE 12A
115A
115B
115C
37
122
QA
EA
QAR
121
VALVE CONTROLLER 123
116A
A
S
R
VALVE CONTROLLER 117A
32A
35A
55A
SEQUENTIAL CONTROLLER
114
52A
54A
110A
P1
PR
EP1
111A
VALVE CONTROLLER 112A
113A
116B
VALVE CONTROLLER 117B
32B
35B
55B
52B
54B
110B
P2
EP2
111B
VALVE CONTROLLER 112B
113B
116C
VALVE CONTROLLER 117C
32C
35C
55C
52C
54C
110C
P3
EP3
111C
VALVE CONTROLLER 112C
113C

PULVERIZED FUEL DELIVERY SYSTEM FOR A BLAST FURNACE

Matter enclosed in heavy brackets [ ] appears in the original patent but forms no part of this reissue specification; matter printed in italics indicates the additions made by reissue. [This application is a division of our copending application Ser. No. 799,773 filed Feb. 17, 1969, now abandoned.] *This application is a continuation of reissue application Ser. No. 6/248,377 filed on Mar. 27, 1981, now abandoned, which was an application for reissue of U.S. Pat. No. 3,720,351 and a division of copending application Ser. No. 799,773 filed on Feb. 17, 1969, and now also abandoned.*

BACKGROUND AND SUMMARY OF THE INVENTON

This invention relates in general to pulverized fuel handling equipment and more particularly to a pulverized fuel delivery method and a system which is capable of injecting pulverized coal into a blast furnace to replace a portion of the coke normally consumed thereby.

In the smelting of iron ore in a blast furnace, coke has been traditionally the material used to provide the carbon and heat necessary for the smelting process. Coke, which normally constitutes about one-third of the furnace charge, is about the most expensive commodity in the production of iron. Consequently, replacement of a portion of the coke used with cheaper coal is of economic importance.

Various prior art systems are available for injecting pulverized coal into a blast furnace to replce part of the coke otherwise consumed, as for example the pulverized coal firing system described by U.S. Pat. No. 3,150,962 issued to L. Pearson, and that described by U.S. Pat. No. 3,301,544 issued to N. W. Eft et al.

This present invention provides a somewhat more sophisticated pulverized coal delivery system for a blast furnace which is capable of automatic operation to meet the varying coal requirements of the blast furnace. In the system of the invention, pulverized coal is delivered in dense phase fluidized form into the blast furnace from gas pressurized tanks that are placed in communication one at a time, in cyclical sequence with a pneumatic transport means. The tank gas pressure is regulated in accordance with the blast furnace wind rate to control the weight flow of pulverized coal into the furnace. The transport gas flow rate is regulated in accordance with the pulverized coal weight flow rate so as to maintain a prescribed transport gas flow rate per pound of coal delivered into the furnace.

Within the system, means are provided for sensing the rate at which pulverized coal is withdrawn from the tanks and for regulating, in accordance with the coal withdrawal rate, the output of the pulverized coal supply means that replenishes the tanks so as to maintain a predetermined total quantity of pulverized coal stored in the system. This assures that there will be an adequate reserve of pulverized coal always available for delivery to the furnace even though the coal consumption rate may fluctuate over a wide range.

The pulverized coal delivery system includes a coal pulverizer which operates to convert the coal as delivered into a dried, pulverized product, a reservoir which receives and stores the pulverized coal output of the pulverizer system and distributor means connected to the reservoir and to feed tanks associated therewith whereby the furnace is supplied from a feed tank through pneumatic transport means. This distributor means also includes multiple valved coal lines for controlling coal flow from the reservoir to the individual feed tanks to replenish them one at a time in a cyclical sequence that is in staggered relation with respect to the coal delivery sequence from the feed tanks to the furnace. Three or more feed tanks are provided so that while one tank is feeding coal to the furnace, the second tank in the sequence is in reserve, filled with coal and pressurized, and thus is instantly available for feeding the furnace as soon as the first tank approaches the empty condition, while the third tank in the sequence is being refilled from the reservoir. With this arrangement uninterrupted coal feed to the furnace is assured, since regardless of which particular tank is feeding the furnace, there will always be a pressurized full tank of pulverized fuel available in reserve.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWING

In the drawing:

FIG. 2 is a schematic diagram illustrating in greater detail the controls associated with the system of FIG. 1.

DESCRIPTION OF THE PREFERRED EMBODIMENTS OF THE INVENTION

Figure 1:
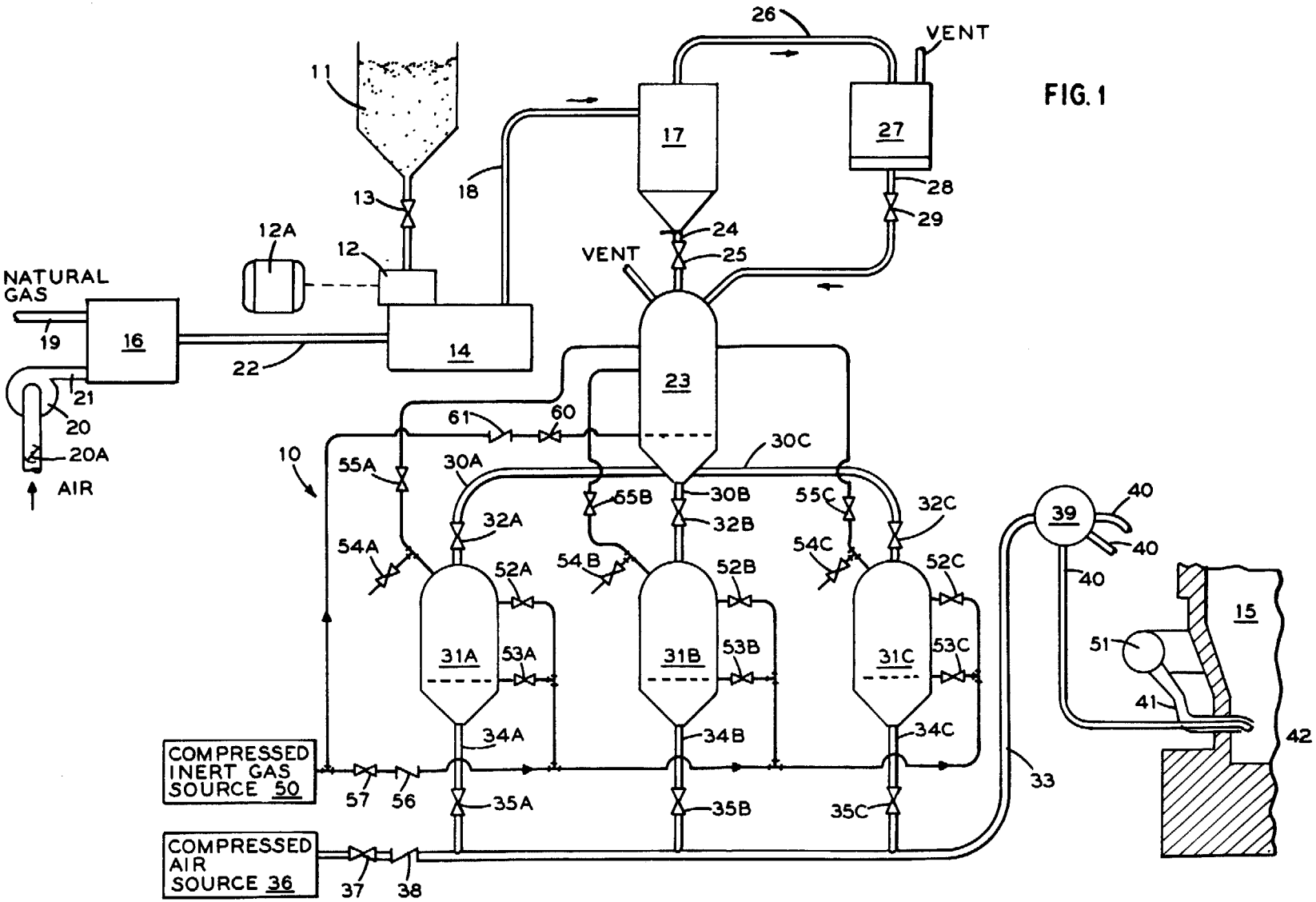
FIG. 1 is a schematic diagram of a pulverized coal delivery system according to a preferred embodiment of the invention.

In the pulverized coal delivery system 10 illustrated by way of example in FIG. 1, raw coal is withdrawn from a storage bunker 11 and flows by gravity through a shut-off valve 13, which is open when system 10 is in operation, to feeder 12. Feeder 12 supplies coal to a pulverized 14 at a rate which can be adjusted by regulating the setting of a variable speed drive means 12A associated with feeder 12 to correspondingly regulate the pulverized coal output rate of pulverizer 14.

The pulverizer 14 operates to convert the raw coal into pulverized coal of a consistancy suitable for conveyance in dense phase fluidized form into a blast furnace 15.

As shown, a separately fired air heater 16 connected to pulverizer 14 by a duct 22 supplies hot primary air to pulverizer 14 to dry the coal and to subsequently convey coal product output through a pipe 18 to the inlet of a cyclone separator 17. The hot primary air is produced by burning natural gas, admitted to heater 16 through a pipe 19, with air being supplied by a primary air fan 20 connected to heater 16 by a duct 21. To allow proportioning of the primary air flow rate according to the coal rate through pulverizer 14, the fan 20 is provided with an adjustable damper 20A.

The air-coal mixture then enters the cyclone separator 17 is centrifugally separated, with the coal passing to a storage reservoir 23 by gravity flow by way of a coal line 24 which is provided with a normally open shut-off valve 25. The extremely fine coal particles entrained in the primary air as it leaves separator 17 are carried along with the air through a pipe 26 to a bag filterhouse 27 or other functionally similar medium and collected therein. The primary air stream is then vented to a low pressure receiver (not shown) and the collected, coal fines are fed to a storage reservoir 23 through a coal line 28 provided with a normally open shut-off valve 29. Surface moisture evaporated from the coal during the pulverizing and storage phases is vented with the primary air.

If desired a plurality of pulverized coal preparation units can be operated in parallel to supply coal to storage reservoir 23, since with multiple units, intermittent operation, maintenance, or emergency servicing of any single unit can be accommodated without necessitating a shut-down of the delivery system 10. In lieu of spare pulverizing capacity afforded by multiple coal preparation units, an auxiliary storage reservoir (not shown) can be provided. The auxiliary tank could be suitably connected to the coal lines 24 and 28 to receive some or all of the pulverizer output in excess of the then current needs of the furnace 15.

The storage reservoir tank 23 is suitably vented so as to operate at atmospheric pressure and serves to provide sufficient storage of pulverized coal to supply a plurality of batch tanks 31A, 31B and 31C which feed the furnace 15. Tanks 31A–C are located at a lower elevation than reservoir tank 23 and are connected thereto by a plurality of corresponding coal distributor lines 30A, 30B, 30C, respectively.

Coal distributor lines 30A–C are provided with remotely operable shut-off valves 32A, 32B, 32C respectively that serve to control the flow of pulverized coal from reservoir tank 23 to the individual batch tanks 31A–C. The tanks 31A–C are placed in communication with a pneumatic transport line 33 by means of corresponding coal outlet lines 34A–C provided with respective coal outflow control valves 35A–C that can be selectively opened to permit coal flow from selected tanks 31A–C, one at a time, to furnace 15 through line 33, and closed to isolate from line 33 those tanks 31A–C other than the one currently selected to supply coal to furnace 15.

Transport line 33 is supplied with the compressed air needed for pneumatic conveyance of the coal by a compressed air source 36, the outlet of which is connected to line 33 through a control valve 37 and a check valve 38.

At the blast furnace 15, line 33 communicates with one or more distributors 39 from which a multiplicity of coal pipes 40 lead to the individual tuyeres 41 of furnace 15, in a manner similar to that described in U.S. Pat. No. 3,150,962 to L. Pearson, and in U.S. Pat. No. 3,204,942 to W. J. Matthys et al. The number of distributors 39 as well as the number of tuyeres 41 served by each distributor 39 can be varied according to the requirements of the blast furnace 15. Each of the pipe 40 is provided with a nozzle 42 which extends through the tuyere 41, opening directly into the furnace 15 directly into the blast air stream introduced through the tuyeres 41 to quickly mix the coal with the blast air within the furnace 15 and thereby promote rapid, complete combustion.

Inert gas is used for pressurizing the tanks 31A–C and also to aerate the coal contents of the tanks and storage reservoir 23. For such purposes, a compressed gas source 50 is provided with a delivery pressure sufficient to maintain dense phase coal flow from any given tank 31A–C into transport line 33 at the maximum anticipated furnace 15 demand rate and against the maximum expected back pressure of the furnace tuyeres 41. The tuyere back pressure can run as high as about 50 psi and is caused by the high static pressure at the bustle pipe 51 which supplies through tuyeres 41 the necessary process air to furnace 15. The choice of an inert gas for pressurizing and aerating is favored because it prevents ignition of the coal within the reservoir 23 and in tanks 31A–C.

In addition to the coal inert valves 32A–C and the coal outlet valves 35A–C, the tanks 31A–C are provided with valves 52A–C, 53A–C, and 54A–C and 55A–C respectively to accomplish the pressurization, aerating, and venting functions required in the operation of the system 10. The pressurizing valves 52A–C are connected by suitably arranged piping to the compressed inert gas source 50 through a check valve 56 and control valve 57, and to the upper portions of their respective tanks 31A–C and when open serve to pressurize the coal contents of the tank. Aeration valves 53A–C are connected to their respective tanks 31A–C and to source 50 by suitably arranged piping in parallel with corresponding valves 52A–C and serve, when open, to introduce inert gas into the lower portion of tanks 31A–C for aerating and coal therein. Valves 54A–C serve, when open, to vent their respective tanks 31A–C to a suitable receiver (not shown).

Valves 55A–C are connected via suitable piping to the storage reservoir 23 and to their respective tanks 31A–C and serve, when open, to equalize the pressures between tanks 31A–C and the reservoir 23. Reservoir 23 is aerated with inert gas passed through a conduit connecting the reservoir and the source 50, and having suitably positioned control valve 60 and check valve 61.

In the operation of system 10, each of the tanks 31A–C is alternately filled, pressurized and emptied to feed the furnace 15 in a predetermined cyclical sequence. For example, while tank 31A is feeding the furnace 15, tank 31B is in standby status, filled with coal and pressurized with inert gas, while tank 31C is being filled with coal from reservoir 23.

Accordingly, it can be stated that each tank 31A, 31B, 31C must necessarily be in one of three operative states, namely:

1. The active mode, characterized by the tank being isolated from the reservoir 23, in communication with the transport line 33, and pressurized to deliver coal to the furnace 15;

2. The standby mode, characterized by the tank being isolated from both the reservoir 23 and the transport line 33, filled with coal and pressurized;

3. The refill mode, characterized by the tank being isolated from the transport line 33, in gas pressure equalizing communication with the reservoir 23, and in coal-flow communication with the reservoir 23, to receive coal therefrom.

After a tank (31A, 31B, 31C) which has been in the active mode becomes empty, that tank is switched to the refill mode, the tank which was in the standby mode is concurrently switched to the active mode so that the furnace 15 may be continuously supplied with coal without interruption or overlap, and the most recently filled tank 17 is switched to the standby mode. The tanks 31A–C and the coal lines 30A–C from reservoir 23 are proportioned so that the tank in the refill mode will be filled with coal to its intended capacity before the then currently active tank becomes empty. Thus when switching tanks, that tank which was in the refill mode is switched to the standby mode so that there is always one tank filled and pressurized and therefore ready to immediately replace the active tank.

One of the advantages of providing three tanks 31A–C is that should it be necessary to remove one tank and its associated control system from service, for maintenance and for repair, it is still possible to continuously supply the furnace 15 using only the two remaining tanks. In such case, the two tanks would alternate between the active and refill modes.

If desired to provide additional batch tank storage capacity, this can be done simply by adding to the system 10 extra tanks equipped with valves and connected in a manner similar to the tanks 31A–C. With more than three tanks 31A–C, there will be available two or more standby tanks.

Preferably, the valves 53A–C are left open during all operating modes to assure satisfactory fluidization of the coal contents of the respective tanks 31A–C.

To place the individual tanks 31A–C in the active, standby and refill modes of operation, their respectively associated coal inlet valves 32A–C, coal outlet valves 35A–C and pressure equalization valves 55A–C are set in the states indicated by the following Table I:

TABLE I

| Valve | Required Valve States Active Mode | Standby Mode | Refill Mode |
|---|---|---|---|
| Coal Inlet (32A-C) | Closed | Closed | Open |
| Coal Outlet (35A-C) | Open | Closed | Closed |
| Equalization (55A-C) | Closed | Closed | Open |

The states of the pressurization and vent valves 52A–C and 54A–C associated with whichever tanks is in the active mode are set by control signals derived on the basis of the difference between the actual coal flow rate to furnace 15 and the required or demand coal flow rate thereto. Should the actual coal flow rate be less than the demand rate, a control signal is applied to open the pressurization valve 52A–C thus increasing the tank gas pressure to raise the actual coal flow rate. Conversely, should the actual coal flow rate be greater than the demand rate, a control signal is applied to open the vent valve 54A–C thereby reducing the tank gas pressure to correspondingly reduce the actual coal flow rate.

To prevent abrupt changes in the coal flow rate to furnace 15 when a standby tank is about to be switched from the active mode, the states of the pressurization and vent valves 52A–C and 54A–C associated with the tank in the standby mode is set by control signals so as to maintain the gas pressure in the standby tank the same as that within the active tank.

The vent valve 54A–C for the tank in the refill mode is kept open and the pressurization valve 54A–C for such refill mode tank is kept closed.

It should be noted that in order to minimize the loading of the gas source 50, the pressurization and vent valves 52A–C and 54A–C for any given tank are never opened simultaneously.

FIG. 2 illustrates by way of example a typical control system 100 which can be used to regulate the operation of the valves 32A–C, 35A–C, 52A–C, 54A–C and 55A–C as to place the tanks 31A–C in their active, standby, and refill modes according to a predetermined sequence, and to regulate the coal output of the pulverizing unit such that a predetermined total weight of coal is maintained within storage reservoir 23 and tanks 31A–C regardless of changes in the coal delivery rate to furnace 15.

Associated with control system 100 are a set of weight measuring transducers 101A–D which are arranged to sense the weight of tanks 31A–C and reservoir 23 respectively, and to establish signals W1, W2, W3, and W23 corresponding to the weight of the coal in the tanks 31A, 31B, 31C and reservoir 23 respectively. These weight signals are applied to a signal summing means 102 which provides an output signal $W_T$ representing the total weight of all the coal currently stored in the system 10 and available for delivery to furnace 15. The weight signals W1, W2, W3, are also applied to respective differentiators 103A, 103B, and 103C which derive therefrom corresponding output signals $Q_1$, $Q_2$ and $Q_3$ representing the rates at which the coal content weights of tanks 31A, 31B and 31C are changing. From the signals $Q_1$, $Q_2$, and $Q_3$, it is possible to determine at any time which of the tanks 31A–C is in the active mode, which tank of tanks are on standby, and which tank is being refilled. For such purpose, the signals $Q_1$, $Q_2$, $Q_3$, are applied to a polarity discriminator 104 which produces an output signal, $Q_C$, equivalent in magnitude to the one of the signals $Q_1$, $Q_2$, $Q_3$ that represents a negative rate of weight change.

For example, when tank 31A is in the active mode, tank 31B on standby and tank 31C is being refilled, signal $Q_1$ will be negative and its magnitude will represent the coal flow rate to furnace 15, signal $Q_2$ will be positive with its magnitude representing the rate at which coal is being transferred from storage reservoir 23 to tank 31C.

The total stored coal weighed signal $W_T$ is applied to an error detector 105 along with a reference signal $W_R$ established by an adjustable selector 205 and representing the total stored coal weight that is to be maintained. Error detector 105 provides an output signal $E_W$ representing the difference, or error between the signals $W_T$ and $W_R$. Error signal $E_W$ is applied to a feeder speed controller 106 that regulates the output speed of the drive means 12A for feeder 12 (see FIG. 1) to correspondingly regulate the coal output of pulverizer 14 in accordance with the value of signal $E_W$ so as to null the error between $W_T$ and $W_R$. Thus, the operation of pulverizer 14 is controlled to continuously introduce pulverized coal into the system 10 at the same rate at which pulverized coal leaves the system 10, and therefore, on a steady state basis the coal inflow rate to storage reservoir 23 will be equal to the actual delivery rate $Q_C$ to furnace 15.

The feeder speed controller 106 is connected to another controller, 107 which regulates the operation of the primary air fan damper 20A in accordance with the feeder 12 speed to maintain a given weight proportion between the primary air flow through pulverizer 14 and the coal flow therethrough.

To determine the pulverized coal requirements of furnace 15, flow transducer 207 is connected to the inlet of bustle pipe 51 (see FIG. 1) to sense the combustion air flow rate, or wind rate, into furnace 15, and to provide an output signal $Q_W$ representative thereof. The wind rate signal $Q_W$ is applied to an adjustable signal translator 108, which establishes an output signal $Q_{CR}$ representing the coal demand rate of furnace 15. The signal ratio $[Q_{CR}/Q_W]$ represents the number of pounds of pulverized coal to be injected into furnace 15 per 1,000 CFM of combustion air and can be adjusted to vary the percentage of coke replacement by pulverized coal in furnace 15 operation.

The coal demand rate signal $Q_{CR}$ is applied to signal converter 109, along with the coal changes in weight rate signal $Q_C$ obtained from discriminator 104. On the basis of the two input signals $Q_{CR}$ and $Q_C$, signal convertor 109 establishes an output signal $P_R$ representing the value of gas pressure required in the tank 31A–C which then is feeding furnace 15 in order to null the difference between the actual coal delivery rate and the demand rate as indicated by signals $Q_C$ and $Q_{CR}$, and thereby maintain a steady state delivery rate equal to the demand rate.

Each of the tanks 31A–C are provided with individual transducers 110A, 110B, 110C respectively, which sense the gas pressure in associated tanks 31A–C and provide output signals $P_1$, $P_2$, $P_3$, indicative of the values of the pressurizing gas pressure then prevailing in tanks 31A, 31B, and 31C respectively.

For the purpose of controlling the gas pressure in each of the tanks 31A–C, the signals $P_1$, $P_2$, and $P_3$ are applied to corresponding error detectors 111A, 111B and 111C respectively, the output signal $P_R$ is also applied to each of the error detectors 111A–C. Error detector 111A establishes an error signal $E_{P1}$ corresponding to the difference between the gas pressure in tank 31A and the required gas pressure indicated by signal $P_R$. Similarly, error detectors 111B and 111C establish error signals $E_{P2}$ and $E_{P3}$ corresponding to the differences between the required gas pressure and that existing in tanks 31B and 31C respectively.

The tank pressure error signals $E_{P1}$, $E_{P2}$, $E_{P3}$ are individually applied to corresponding valve controllers 112A, 112B, 112C that regulate the operation of the associated pressuring valves 52A–C and vent valves 54A–C in accordance with the information presented by signals $E_{P1}$, $E_{P2}$, $E_{P3}$ and with mode indicator signals that are also applied to controllers 112A–C via respective input lines 113A, 113B, 113C as will be more fully described later.

The operation of the controllers 112A–C is best explained by considering a typical example in which tank 31A is active, tank 31B is on standby, and tank 31C is being refilled. Under such conditions, controller 112A, which has signal output lines connected to the operating solenoids of the valves 52A and 54A associated with tank 31A will regulate the opening and closing of the valves 52A, 54A in accordance with the signal $E_{P1}$, so as to null the pressure error represented thereby. If signal $E_{P1}$ indicates that the tank 31A pressure is greater, by a predetermined threshold value, than the required value, controller 112A will cause the pressurizing valve 52A to be held closed and the vent valve 54A to be opened until the tank 31A pressure decreases to the required value, upon which occurrence, vent valve 54A will be closed by controller 112A. Conversely, should signal $E_{P1}$ indicate that the tank 31A pressure is lower, by a predetermined threshold value, than the required pressure, controller 112A will cause the vent valve 54A to be held closed and the pressurizing valve 52A to be opened until the tank 31A pressure increases to the required value, upon which occurrence, valve 52A will be closed by controller 112A.

Controller 112B has signal output lines connected to the operating solenoids of the valves 52B and 54B associated with tank 31B, and when tank 31B is either active or on standby, controller 112B regulates the opening and closing of valves 52B and 54B to maintain the tank 31B gas pressure equal to the required value set by signal $P_R$, in the same manner as previously described in connection with controller 112A.

With regard to controller 112C and the valves 52C and 54C associated with the tank 31C that is in the refill mode, it should be noted that such mode requires that the tank be vented to a low pressure receiver (not shown). Accordingly, where tank 31C is being refilled, the mode indicator signal applied to controller 112C vai line 113C and identifying tank 31C as being in the refill mode causes said controller 112C to hold the pressurizing valve 52C closed, and the vent valve 54C open regardless of the value of the signal $E_{P3}$.

Although in the example given, individual tanks 31A–C were identified as being in specific operating modes, it will be understood that during the normal operating cycle of the system 10, the tanks 31A–C will be placed in their other modes in accordance with a set sequential pattern, and the controllers 112A–C will function (1) to maintain the active tank at the pressure required to satisfy the coal demand rate, (2) to maintain the standby tank at the same pressure as the active tank, and (3) to maintain venting of the refill tank during the filling operation regardless of which of the tanks 31A–C are in a particular mode.

A typical mode sequencing program for the tanks 31A–C is given by the following Table II:

TABLE II

| Sequence Period | Active Tank | Standby Tank | Refill Tank |
|---|---|---|---|
| 1 | 31A | 31B | 31C |
| 2 | 31B | 31C | 31A |
| 3 | 31C | 31A | 31B |
| 4 | 31A | 31B | 31C |

From Table II it can be noted that the tank mode pattern is repeated after every third period in the sequence becuase there are three tanks 31A–C and each is capable of assuming the three different modes.

The setting of the tanks 31A–C in the sequence of modes prescribed by Table II is accomplished by means of a sequential controller 114 having input lines 115A–C which receive the tank weight signals W1, W2, and W3 provided by transducers 110A–C, and which has three sets of output lines 116A–C, one set for each corresponding tank 31A–C. Each output line set 116A–C includes three output lines A, S, R that carry mode command signals for establishing the corresponding tank 31A–C in the active, standby, and refill modes respectively.

The sequential controller 114 output line groups 116A–C are connected to corresponding valve controllers 117A–C to regulate the operate thereof.

The valve controllers 117A–C have output lines connected to the operating solenoids of the coal inlet, coal outlet and pressure equalizing vent valves 32A–C, 35A–C and 55A–C. The refill R lines of line groups 116A–C are connected to the mode indicator input lines 113A–C of respective valve controllers 112A–C.

The valve controllers 117A–C themselves are so constructed and arranged that a mode command signal applied to the active A line of any controller 117A–C causes that controller to set the three valve groups, (32A, 35A, 55A), (32B, 35B, 55B), (32C, 35C, 55C) associated with the controller in the states required to place the corresponding tank 31A–C in the active mode. Similarly, a mode command signal applied to the standby S line of a particular controller 117A–C causes it to set its three valve group in the states required to place the corresponding tank 31A–C in the standby mode. Likewise, a mode command signal applied to the refill R line of a controller 117A–C causes it to set its three valve group in the states required to place the corresponding tank 31A–C in the refill mode. In addition, a mode control signal on the R line of a controller 117A–C is carried via the connected line 113A–C to the corresponding controller 112A–C to set the valves (52A and 54A), (52B and 54B) or (52C and 54C) associated therewith in the states required when the corresponding tank 31A–C is the refill mode.

At any given time, the controller 114 applies only one mode command signal per output line set. For example, in the first period of the sequence defined by Table II, controller 114 applies a mode command signal to the A line of the set 116A to put tank 31A in the active mode, applies a second mode command signal to the S line of the set 116B to put tank 31B in standby mode, and applies a third mode command signal to the R line of set 116C to put tank 31C in the refill mode. During the course of such first period, the coal weight in tank 31A will decrease and the coal weight in tank 31C will increase. Should the coal weight in tank 31C reach a predetermined maximum value as indicated by the W3 signal before the coal weight in tank 31A reaches a predetermined minimum value as indicated by the W1 signal, controller 114 will switch the third mode command signal from the R line of set 116C to the S line to put tank 31C into the standby mode, thereby eliminating any possibility of overfilling tank 31C.

For sustained pulverized coal delivery to furnce 15, without interruptions, it is necessary that the coal transfer rates from storage reservoir 23 to the individual tanks 31A–C during their refill modes be at least equal to, and preferably somewhat greater than the maximum anticipated coal outflow rate of any tank 31A–C during its active mode. Consequently, it is to be expected during any typical period of operation that the tank which at the beginning of the period was in the refill mode will become filled with coal up to its maximum coal weight before the active tank is emptied to its minimum coal weight, which of course, need not be a completely empty condition.

In such case, during the latter part of the first period of operation, there will be two tanks, 31B and 31C on standby, and the one tank 31A active.

When the coal weight in the active tank 31A reaches the predetermined minimum value, controller 114 terminates the first period of operation and initiates the second by applying mode command signals to the R line of set 116A, the A line of set 116B, and the S line of set 116C. Here again, should the coal weight in the refill tank 31A reach the maximum value before the end of the second period, controller 114 will switch the command signal from the R line of set 116A to the S line in place tank 31A on standby. The second period of operation ends and the third period commences when the coal weight in tank 31B reaches the minimum value.

At the end of the third period, which occurs when the coal weight in tank 31C reaches the minimum value, controller 114 sets the tanks 31A–C in the same modes as in the first period, and the tank mode program cycle is repeated.

In the operation of the blast furnace 15, the combustion air is supplied at a temperature normally 1,000° F. or greater above the temperature of the carrier gas, which is preferably air, introduced into line 33 (see FIG. 1) for transporting coal into furnace 15. For efficient furnace 15 operation, it is important to minimize the amount of cold air injected into the furnace 15 along with the coal, since whatever cold air goes into the furnace 15 necessitates using a portion of the fuel to supply the heat necessary to raise the temperature of the coal-air mixture to furnace 15 operating temperature. On the other hand, if the flow of carrier air in the transport line 33 is too low for the coal flow rate, there is the danger of compacting and plugging the line. Accordingly, there are optimal carrier air flow to coal flow rates which are conducive to efficient operation of blast furnace 15.

The invention provides means for automatically regulating the flow of carrier air into transport line 33 in accordance with the coal flow rate, or more precisely in accordance with the coal demand rate of furnace 15.

For such purpose, the coal demand rate signal $Q_{CR}$ from signal translator 108 is applied to another signal translator 120 that provides an output signal $Q_{AR}$ representing the required flow rate of carrier air to be supplied to transport line 33 for the coal flow rate represented by signal $Q_{CR}$.

The signal $Q_{AR}$ is applied to an error detector 121 along with a signal $Q_A$ derived from a flow transducer 122 connected to the carrier gas source 36 to sense the flow rate of carrier air into line 33. Signal $Q_A$ represents the actual flow rate of carrier air. Error detector 121 supplies the input of a valve controller 123 an error signal $E_A$ representing the difference between the actual and the required carrier air flow rates. Controller 123 has an output connected to the operating solenoid of valve 37 and serves to vary the effective opening of valve 37 in accordance with signal $E_A$ so as to null the carrier air flow rate error represented thereby and thus maintain on a steady state basis a carrier air flow rate equal to that prescribed for the coal demand rate.

It should be noted that while the carrier air flow rate could be regulated on the basis of the actually existing coal flow rate, regulation on the basis of the coal demand rate is preferable since it tends to minimize the effects of system time constant lags.

As can be appreciated by the artisan, the pulverized coal delivery system 10 can be operated manually instead of automatically as provided by the control system 100, in which case the operation of the various valves associated with the tanks 23 and 31A–C, and the pulverization unit would be operated by personnel monitoring the various weight, pressure and flow transducers provided in the system.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

[1. A method of supplying pulverized fuel to a blast furnace which comprises introducing a quantity of pulverized fuel into a tank, pressurizing the tank with a gas, communicating the tank with the furnace to allow flow of pulverized fuel thereto under the influence of the gas pressure in the tank, and adjusting said gas pressure in accordance with a condition of the furnace to correspondingly regulate the flow rate of pulverized fuel thereto.]

[2. A method according to claim 1 wherein said tank gas pressure is adjusted in accordance with the flow rate of combustion air to the blast furnace.]

[3. A method according to claim 2 wherein said tank is communicated with the furnace through a conduit and including the step of introducing a carrier gas under pressure into said conduit to pneumatically convey said pulverized fuel therethrough into the furnace.]

4. [A method according to claim 3 including the step of] *A method of supplying pulverized fuel to a blast furnace which comprises introducing a quantity of pulverized fuel into a tank, pressurizing the tank with an inert gas, communicating the tank with the furnace to allow flow of pulverized fuel thereto under the influence of the gas pressure in the tank, and adjusting said gas pressure in accordance with the flow rate of combustion air to the blast furnace to correspondingly regulate the flow rate of pulverized fuel thereto wherein said tank is communicated with the furnace through a conduit, introducing a carrier gas under pressure into said conduit to pneumatically convey said pulverized fuel therethrough into the furnace and* adjusting the flow rate of said carrier gas into the conduit in accordance with flow rate of pulverized fuel out of said tank to maintain a given carrier gas flow rate per weight unit of pulverized fuel delivered into the blast furnace.

5. [A method according to claim 1 including the steps of] *A method of supplying pulverized fuel to a blast furnace which comprises introducing a quantity of pulverized fuel into a tank, pressurizing the tank with an inert gas, communicating the tank with the furnace to allow flow of pulverized fuel thereto under the influence of the gas pressure in the tank, and adjusting said gas pressure in accordance with the flow rate of combustion air to the blast furnace to correspondingly the regulate flow rate of pulverized fuel thereto,* sensing the weight of said tank to determine the delivery rate of pulverized fuel into the furnace, converting raw fuel into pulverized fuel at a rate equal to said delivery rate, and storing the pulverized fuel resulting from such conversion for subsequent transfer into said tank to replenish the pulverized fuel supply thereof.

[6. In a method of supplying pulverized coal to a blast furnace having a plurality of pressurizable tanks for holding pulverized fuel, a conduit communicating with the blast furnace, and means for selectively communicating each of said tanks with said conduit, a method of supplying pulverized fuel to the blast furnace which comprises the steps of communicating said tanks, one at a time in a predetermined sequence, with said conduit, pressurizing with a gas the tank currently communicated with the conduit to effect flow of pulverized fuel from that tank into the conduit, introducing a carrier gas under pressure into said conduit to pneumatically convey said pulverized fuel therethrough into the blast furnace, and adjusting the gas pressure in said communicated tank in accordance with a condition of the furnace to correspondingly regulate the flow of pulverized fuel thereto.]

[7. A method according to claim 6 including the steps of pressurizing with a gas the next tank in said sequence to be communicated with said conduit and adjusting the gas pressure in said next tanks to maintain such gas pressure equal to that in the tank currently communicated with the conduit.]

8. [A method according to claim 6 including the step of] *A method of supplying pulverized coal to a blast furnace having a plurality of pressurizable tanks for holding pulverized fuel, a conduit communicating with the blast furnace, and means for selectively communicating each of said tanks with said conduit, which comprises the steps of communicating said tanks, one at a time in a predetermined sequence, with said conduit, pressurizing with an inert gas the tank currently communicated with the conduit to effect flow of pulverized fuel from that tank into the conduit, introducing a carrier gas under pressure into said conduit to pneumatically convey said pulverized fuel therethrough into the blast furnace, and adjusting the gas pressure in said communicated tank in accordance with the flow rate of combustion air to the blast furnace to correspondingly regulate the flow of pulverized fuel thereto,* adjusting the flow rate of said carrier gas into the conduit in accordance with the flow rate of pulverized fuel out of said communicated tank to maintain a given carrier gas flow rate per weight unit of pulverized fuel delivered into the blast furnace.

9. [A method according to claim 6 including the steps of] *A method of supplying pulverized coal to a blast furnace having a plurality of pressurizable tanks for holding pulverized fuel, a conduit communicating with the blast furnace, and means for selectively communicating each of said tanks with said conduit, which comprises the steps of communicating said tanks, one at a time in a predetermined sequence, with said conduit, pressurizing with an inert gas the tank currently communicated with the conduit to effect flow of pulverized fuel from that tank into the conduit, introducing a carrier gas under pressure into said conduit to pneumatically convey said pulverized fuel therethrough into the blast furnace, and adjusting the gas pressure in said communicated tank in accordance with the flow rate of combustion air to the blast furnace to correspondingly regulate the flow of pulverized fuel thereto,* sensing the weight of said communicated tank to determine the delivery rate of pulverized fuel into the blast furnace, converting raw fuel into pulverized fuel at a rate equal to said delivery rate, accumulating the pulverized fuel resulting from such conversion, and introducing such accumulated pulverized fuel into one of said tanks other than the tank communicated with the conduit to continuously maintain within said tanks a supply of pulverized fuel available for delivery to the blast furnace.

* * * * *